Oct. 1, 1963  R. G. STUTZ  3,105,659
COMPOUND HELICOPTER

Filed March 30, 1962  3 Sheets-Sheet 1

INVENTOR
RICHARD G. STUTZ
BY Jack N. McCarthy
AGENT

Oct. 1, 1963 R. G. STUTZ 3,105,659
COMPOUND HELICOPTER
Filed March 30, 1962 3 Sheets-Sheet 2

INVENTOR
RICHARD G. STUTZ
BY
AGENT

Oct. 1, 1963 R. G. STUTZ 3,105,659
COMPOUND HELICOPTER
Filed March 30, 1962 3 Sheets-Sheet 3

INVENTOR
RICHARD G. STUTZ
BY Jack N. McCarthy
AGENT

United States Patent Office 3,105,659
Patented Oct. 1, 1963

3,105,659
COMPOUND HELICOPTER
Richard G. Stutz, Stratford, Conn., assignor to United Aircraft Corporation, East Hartford, Conn., a corporation of Delaware
Filed Mar. 30, 1962, Ser. No. 183,970
18 Claims. (Cl. 244—7)

This invention relates to a winged compound helicopter.

An object of this invention is to provide a convertible aircraft which will have a high payload.

Another object of this invention is to provide a convertible aircraft having a radius of operation which will permit adequate support missions.

A further object of this invention is to provide a convertible aircraft having high speeds so that the productivity of the aircraft will be high and the vulnerability to attack will be reduced.

Another object of the invention is to provide a convertible aircraft with a minimum of rotor downwash.

Another object of this invention is to provide an aircraft having means for control by a single pilot maintaining any reasonable flight path.

A further object of this invention is to provide for the reversal of the transition process at any stage of transition.

Another object of this invention is to provide in the airplane mode, automatic control of the rotor in autorotation by a control device sensing rotor r.p.m. and controlling cyclic pitch.

Other objects and advantages will become apparent with a review of the following specification, claims and drawings:

Figure 1:
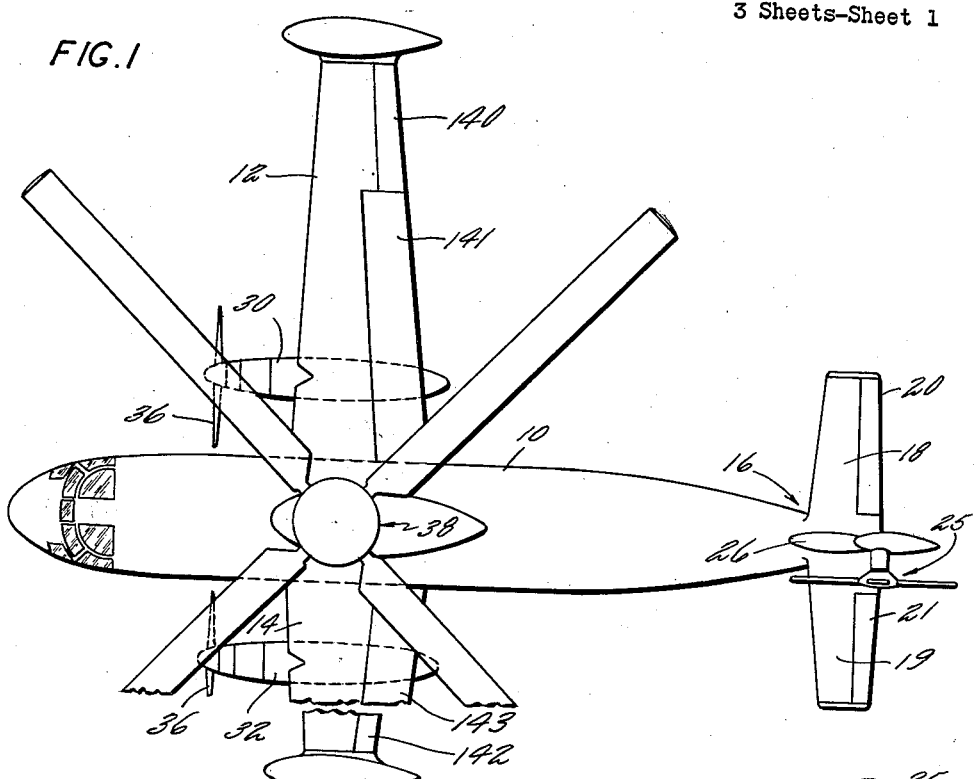
FIG. 1 is a top view of a winged compound helicopter.
Figure 2:
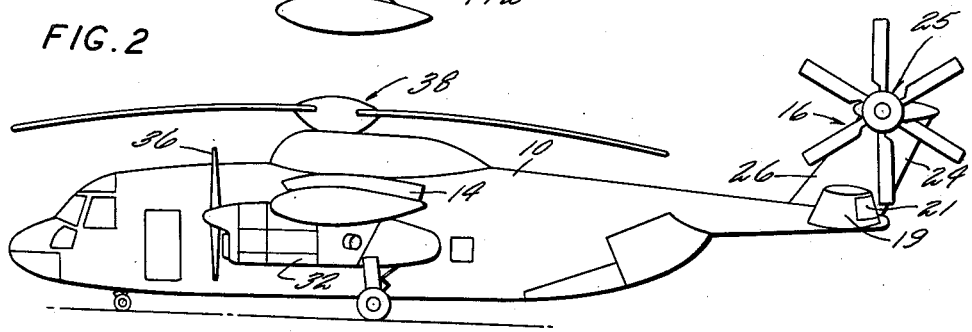
FIG. 2 is a side view of the winged compound helicopter shown in FIG. 1.
Figure 3:
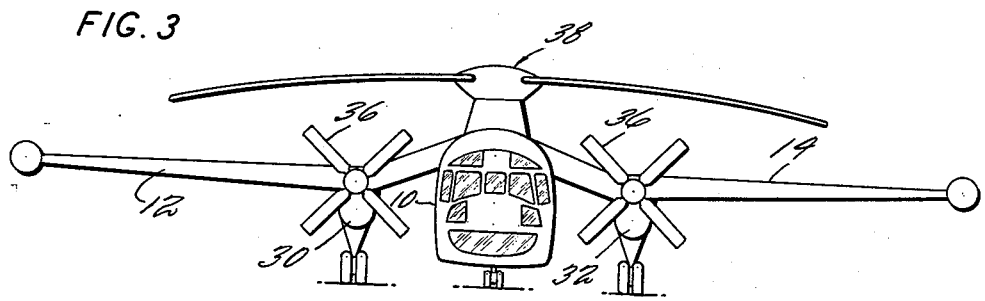
FIG. 3 is a front view of the winged compound helicopter shown in FIG. 1.

As shown in FIGS. 1, 2 and 3, the compound helicopter includes an elongated fuselage 10 having conventional airplane wings 12 and 14 mounted on opposite sides thereof. Wings 12 and 14 have a symmetrical airfoil section. Each wing 12 and 14 has an aileron 140 and 142, respectively, and a conventional flap 141 and 143, respectively. Flaps 141 and 143 are trailing portions of each wing. An empennage 16 includes horizontal stabilizers 18 and 19, elevators 20 and 21, a vertical stabilizer 26, a rudder 24, and a tail rotor 25. An engine 28 is fixed to each wing 12 and 14. The engines are located in nacelles 30 and 32, respectively.

Elevator 20 is pivotably mounted on a bracket 33 and elevator 21 is pivotally mounted on a bracket 35. Each elevator has an arm extending upwardly therefrom for pivoting said elevator about its axis. Conventional elevator trim controls can be used. The upper end of the lever attached to elevator 20 is attached to a rod 37. This rod 37 is moved by an electrical actuator 39. The upper end of the lever attached to elevator 21 is attached to a rod 41. This rod 41 is moved by an electrical actuator 43. These electrical actuators 39 and 43 are receiving portions of an electrical system for remote control. The signal to operate the electrical actuators 39 and 43 is obtained in a manner to be hereinafter described.

The rudder 24 is fixedly mounted on a shaft 45 which is in turn pivotably mounted with respect to the vertical stabilizer 26. The shaft 45 is rotated by an electrical actuator 47. This actuator is the receiving portion of an electrical system for remote control. The tail rotor 25 has each of its two blades 49 and 51 mounted for pitch changing movement. A conventional pitch changing mechanism rotates the blades about their pitch changing axes. A rod 53 is attached to the pitch changing mechanism to actuate it. This rod 53 is moved by an electrical actuator 55, which is the receiving portion of an electrical system for remote control. The signal to operate the electrical actuators 47 and 55 is obtained in a manner to be hereinafter described.

Flap 141 is pivotally mounted on a bracket 57 and flap 143 is pivotably mounted on a bracket 59. Each flap has an arm extending upwardly therefrom for pivoting said flap about its axis. The upper end of the lever attached to flap 141 is attached to a rod 61. This rod 61 is moved by an electrical actuator 63. The upper end of the lever attached to flap 143 is attached to a rod 65. This rod 65 is moved by an electrical actuator 67. These electrical actuator 63 and 67 are receiving portions of an electrical system for remote control. The signal to operate the electrical actuators 63 and 67 is obtained in a manner to be hereinafter described.

Each engine has an output shaft 34 drivingly connected to a propeller 36. Both engines 28 are also drivingly connected to a helicopter rotor 38 and the tail rotor 25.

The engines are of the type having a fuel control with an engine speed governor. The gearing between each engine and helicopter rotor 38 is designed to give the desired rotor speed at the speed of the engines set by the governor. The gearing between each engine and the propeller 36 is designed to provide the proper drive for the propeller. Engines in the S-61 type helicopter could be used.

Landing gear is attached to the aircraft and extends downwardly from the engine nacelles 30 and 32, and a nose wheel extends downwardly from the forward part of the fuselage 10. The fuselage 10 has a forward pilot's compartment while the remaining rearward portion can be used as a passenger compartment or a cargo compartment.

The main rotor head 38 is mounted on the top of a driving shaft 40. The driving shaft 40 is mounted for rotation in a main gear box 42 which is fixed to aircraft structure and has a shaft tilt angle of zero. A bearing unit 44 is located between the shaft 40 and the top of the gear box 42 and a bearing unit 46 is mounted between the shaft 40 and the lower end of gear box 42. A lower sleeve 48 is concentrically mounted with shaft 40 about its lower end. This sleeve 48 is mounted for rotation within the gear box 42 by bearing units 50 and 52. An upper sleeve 54 is concentrically mounted about the shaft 40 and is drivingly connected to said shaft at its upper end by a planetary gear unit 56. The lower end of the sleeve 54 is attached by a clutch mechanism 58 to the upper end of the lower sleeve 48. This clutch mechanism 58 is one which can be locked out of a driving connection. An actuating device 57 is connected to the clutch mechanism 58 to move it between its "out" and "normal clutching" positions. Actuating device 59 receives a signal for operation in a manner to be hereinafter described. A freewheeling action is always permitted between upper sleeve 54 and the lower sleeve 48 so that the main rotor is free to autorotate in case of an emergency.

A bevel gear 60 is mounted around the upper sleeve 54. This bevel gear 60 provides the driving force for the tail rotor 25. The driving connection between the bevel gear 60 and the tail rotor 25 comprises a bevel gear 62, a shaft 64, a gear box 66, a shaft 68 and a tail rotor driving unit 70.

Lower sleeve 48 has a bevel gear 72 mounted thereon through which the engines 28 drive the lower sleeve and therefore the main rotor 38 and the tail rotor 25 when the clutch 58 is engaged. A bevel gear 74 meshes on each side of bevel gear 72. Each bevel gear 74 is driven by a shaft 76 from its cooperating engine 28.

The main rotor 38 comprises a rotor head having upper and lower plates with blades 78 mounted thereon. These blades 78 are mounted for flapping movement, drag movement, and pitch changing movement. A rotor head of this type is shown in U.S. Patent No. 2,638,994 to Michel D. Buivid.

Each blade 78 has a pitch horn 80 which is connected to a swash plate mechanism 82. This swash plate mechanism comprises an upper rotating plate 84 and a lower stationary plate 86. These plates are mounted for relative rotary movement and for movement angularly in unison about a ball 88 slidably mounted on the shaft 40. The upper swash plate 84 is attached to each pitch horn 80 by a separate link 90. This link 90 transmits the motion of the swash plate mechanism to the blades.

To obtain longitudinal movement, two bell cranks 92 and 94 are pivotably mounted to the aircraft on a foreand-aft line on said aircraft. These bell cranks are mounted having horizontal arms extending one towards another with each vertical arm extending downwardly. The free ends of the horizontal arms are connected by link mechanisms 96 and 98, respectively, to the stationary swash plate 86. The free end of the downwardly extending arms of the bell cranks 92 and 94 are connected by a link 100. Link 100 is contoured to go around the shaft 40. It can be seen that as the link 100 is moved forwardly the free end of the horizontal arm of the bell crank 94 moves upwardly and the free end of the horizontal arm 92 moves downwardly. This causes the swash plate mechanism 82 to tilt forwardly about the ball 88. This will impart a cyclic movement to the rotor blades as the rotor head rotates. As link 100 is moved rearwardly the swash plate mechanism 82 will tilt rearwardly about the ball 88. A similar bell crank is fixed to the aircraft in the same manner and is attached to the lower or fixed swash plate 86 at one side of the aircraft (not shown). This bell crank and connection is the same as the bell cranks 92 and 94 shown and the links 96 and 98 shown. Movement of this bell crank tilts the swash plate mechanism 82 in a direction 90° from that of the other two, that is in a sideward direction. A conventional scissors arrangement is connected between the lower swash plate on the opposite side of the aircraft from the bell crank to maintain the swash plate 86 fixed.

To obtain a change in collective pitch, link mechanisms 96 and 98, which are used to obtain longitudinal movement of the swash plate, and the like link mechanism which is used to obtain lateral movement thereof, are each constructed adjustable in length. If a change in collective pitch is desired, the links are merely expanded or retracted an equal amount to slide the ball 88 in a direction upwardly or downwardly about the shaft 40. The links of the mechanism can include hydraulic actuating units or electrical actuating units to provide the actuation of the links to change their length.

The longitudinal cyclic pitch control comprises a cylinder and piston unit 102 having a servo valve 104. The servo valve 104 has an input rod 106 and the piston of the cylinder and piston unit 102 has a piston rod 108 extending externally of the cylinder 110. As the rod 106 is moved, the rod 108 moves accordingly. Movement of the rod 106 to the left directs a fluid (fluid source not shown) to the right of the piston in cylinder 110 and connects the left side of the piston to drain. This provides for movement of rod 108 to the left. When rod 106 is moved to the right, fluid is directed to the left side of the piston in the cylinder 110 and the right side of the piston is connected to drain, this permits the rod 108 to move to the right. Rod 106 is moved by an electric actuator 112 which is the receiving portion of an electrical system for remote control. The signal to operate the electric actuator 112 is obtained in a manner to be hereinafter described.

The lateral cyclic pitch control comprises a cylinder and piston unit 114 having a servo valve 116. The servo valve 116 has an input rod 118, and the piston of the cylinder and piston unit 114 has a piston rod 120 extending externally of the cylinder 122. As the rod 118 is moved, the rod 120 moves accordingly. It must be remembered that while these units are shown in front of the shaft 40, they are actually located to effect movement of a link mechanism attached to the side of the swash plate mechanism. The rod 118 moves the rod 120 in the same manner in which rod 106 moves rod 108, described above. Rod 118 is moved by an electric actuator 124. This electric actuator 124 receives a signal in a manner to be hereinafter described.

The collective pitch control comprises a cylinder and piston unit 126 having a servo valve 128. The servo valve 128 has an input rod 130, and the piston of the cylinder and piston unit 126 has a piston rod 132 extending externally of the cylinder 134. As the rod 130 is moved, the rod 132 moves accordingly. The rod 130 moves the rod 132 in the same manner in which rod 106 moves rod 108, described above. Rod 130 is moved by an electric actuator 136. Rod 132 actuates a control device 133 to send a signal to all of the link mechanisms. The signal to operate the actuator 136 is obtained in a manner to be hereinafter described.

Each wing 12 and 14 includes an aileron 140 and 142, respectively. Aileron 140 is pivotally mounted on a bracket 144, and aileron 142 is pivotally mounted on a bracket 146. Each aileron has an arm extending upwardly therefrom for pivoting said aileron about its axis. The upper end of the lever attached to aileron 140 is attached to a rod 148. This rod 148 is moved by an electrical actuator 150. The upper end of the lever attached to aileron 142 is attached to a rod 152. This rod 152 is moved by an electrical actuator 154. The signal to operate the electrical actuators 150 and 154 is obtained in a manner to be hereinafter described. Each actuator, 150 and 154, moves the rods 148 and 152 in opposite directions an equal amount in response to the same signal. This action creates unequal or opposing lifting forces on opposite sides of the aircraft. While an aerodynamic surface is shown as an aileron other means can be used.

Controls for this winged compound helicopter include a transition lever 200, an azimuth lever 202, a collective pitch lever 204, a flap lever 206, and foot pedals 208 and 210 for controlling a tail movement. The transition lever 200 has three functional positions: (1) normal helicopter mode with rotor powered at normal engine driven speed; (2) transition mode with rotor autorotating at normal engine driven speed; and (3) airplane mode with rotor autorotating at a normal selected tip speed.

Figure 4:
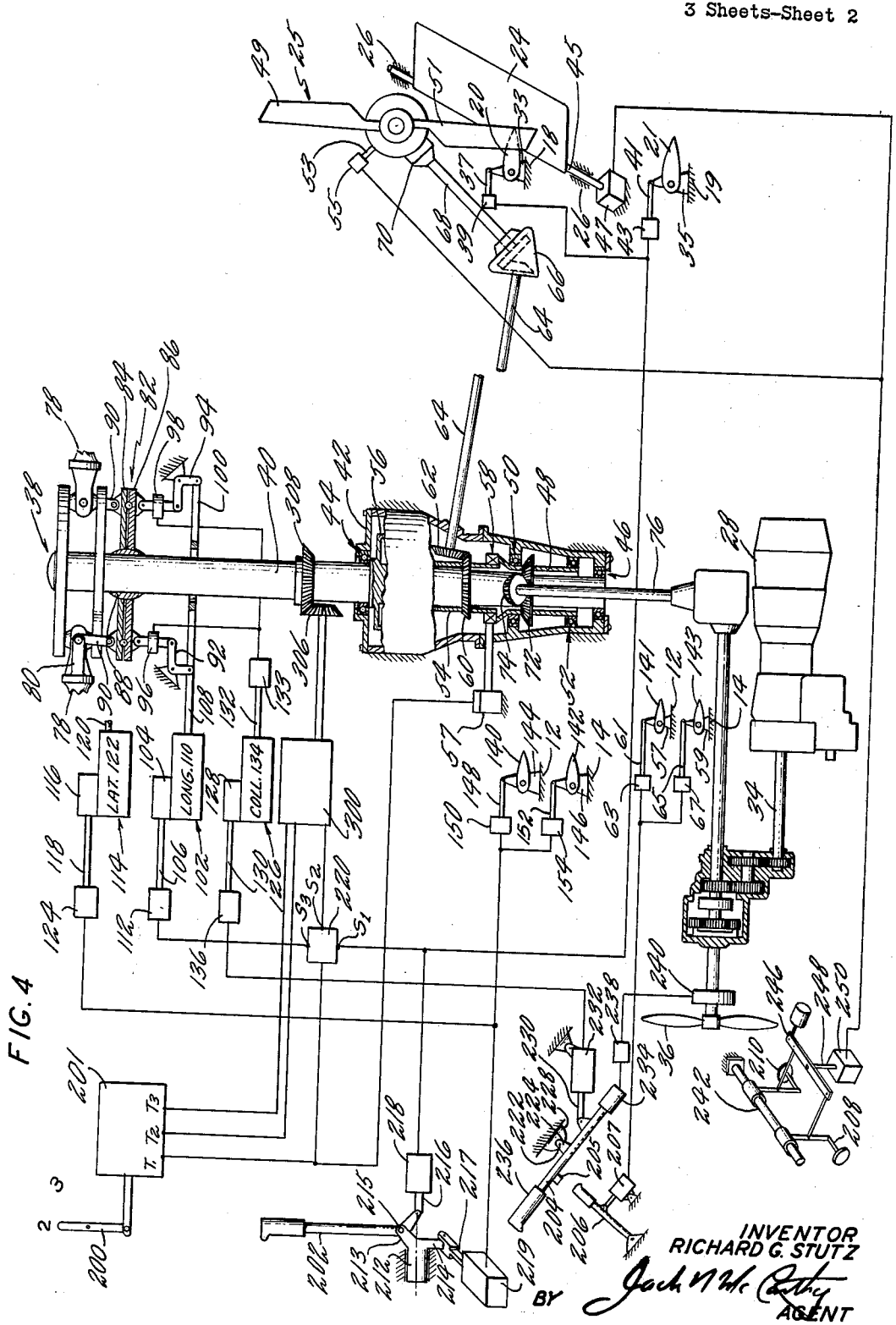
FIG. 4 is a schematic drawing of the controls of the compound helicopter shown in FIGS. 1–3.
Figure 5:
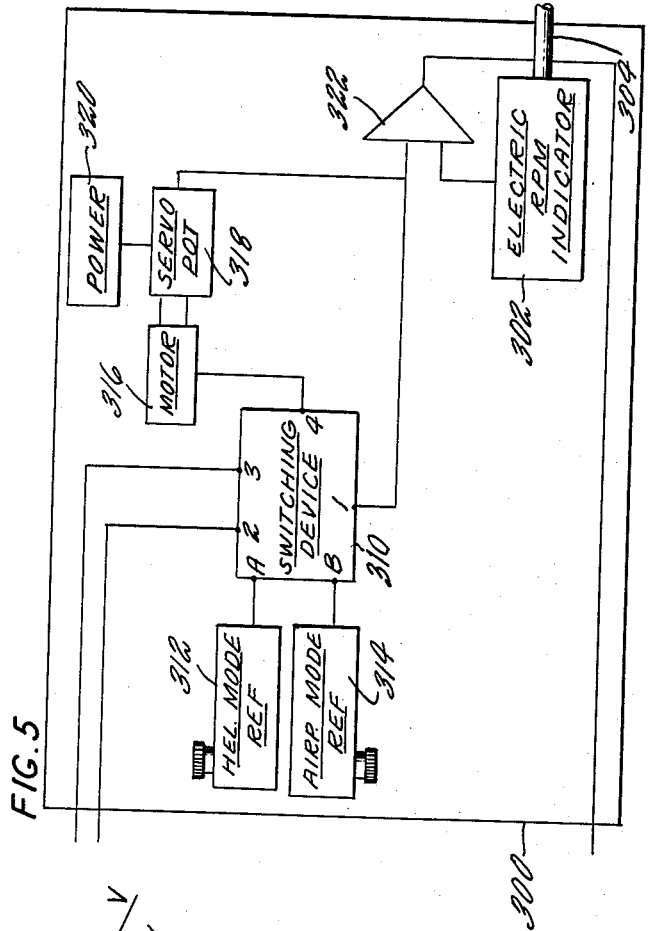
FIG. 5 is an enlarged view of the control device which provides automatic control for the cyclic pitch control.

The azimuth lever 202 is mounted for universal movement with relation to the aircraft. As seen in FIG. 4, a mounting member 212 is mounted in the aircraft for rotation about an axis which extends longitudinally of the aircraft. Mounting member 212 has a bifurcated portion 213 which extends rearwardly and upwardly, and has an arm 214 which extends downwardly. The azimuth lever 202 is pivotably mounted adjacent its lower end between the tines of the bifurcated portion 213 at 215. The lower end of the azimuth lever 202 extends downwardly and rearwardly from its pivotal mounting point. It can be seen that longitudinal movement of the lever can be accomplished by movement about its pivotal point 215, and lateral movement can be accomplished by movement of the lever along with rotative movement of the mounting member 212.

The lower free end of the azimuth lever 202 is connected to the input rod 216 of the transmitting portion 218 of an electrical system for remote control, and transmits longitudinal movement of the azimuth lever to it. This transmitting portion 218 is directly connected to electrical actuators 39 and 43 and is connected through a switching device 220 to electrical actuator 112. The lower free end of the arm 214 is connected to the input rod 217 of the transmitting portion 219 of an electrical system for remote control and transmits lateral movements of the azimuth lever to it. This transmitting portion 219 is directly connected to electrical actuators 150 and 154 and to electrical actuator 124. As can be seen, the azimuth lever acts as a cyclic pitch lever in helicopter mode and as an airplane control lever in airplane mode.

The collective pitch lever 204 is mounted for pivotal movement with relation to the aircraft. As seen in FIG. 4, a bifurcated portion 222 extends from the lever and is pivotably mounted at 224 to bracket 228 which is fixed to the aircraft. The lower portion of the collective pitch lever 204 is connected to input rod 230 of the transmitting portion 232 of an electrical system for remote control. This transmitting portion 232 is directly connected to electrical actuator 136. Another transmitting portion 234 of an electrical system for remote control is fixed to the collective pitch lever 204 and is actuated by movement of the hand twist grip 236 of the collective pitch lever. This transmitting portion 234 is directly connected to a console propeller pitch control 238. The console propeller pitch control 238 is in turn connected to each propeller pitch control 240. The propeller pitch control 240 is a conventional control for such purpose which actuates the blade pitch of the propeller 36. As the hand grip is twisted the pitch of both propellers is changed. The console allows separate control of propeller pitch.

Means 205 are provided to hold the collective stick in a low position which corresponds to the collective pitch value selected for autorotation in the airplane mode. This holding means 205 provides the pilot with a positive means of identification for the collective position setting required for airplane flight. While this will vary with aircraft, its value should be kept low and preferably at a value from zero to −5°.

The flap lever 206 is mounted for pivotal movement at its lower end with relation to said aircraft. Said lever 206 is connected intermediate its two ends to the input rod of the transmitting portion 207 of an electrical system for remote control. This transmitting portion 207 is directly connected to electrical actuators 63 and 67, referred to above. The manual positioning of the flap lever 206 places the flaps 141 and 143 in a desired position for helicopter flight, airplane flight, or transitional flight.

Foot pedals 208 and 210 are pivotably mounted for a fore-and-aft movement on a rod 242 which is fixed to the aircraft. Each pedal is connected by a rod to opposite ends of a beam 246. Beam 246 is fixedly connected to a shaft 248 which in turn is mounted for rotation with respect to said aircraft. Shaft 248 serves as an input to the transmitting portion 250 of an electrical system for remote control. This transmitting portion 250 is directly connected to electrical actuators 47 and 55 to obtain a simultaneous pitch changing movement of the blades 49 and 51 of the tail rotor 25 along with the rudder 24.

The switching device 220 is a solenoid operated switch which is biased to a position connecting terminal S1 to terminal S3, that is, it would make a connection from the transmitting portion 218 to the electrical actuator 112. When the solenoid has been energized the switching device 220 is actuated so that terminal S2 is connected to terminal S3, that is, the output from a control device 300, to be hereinafter described, is connected to the electrical actuator 112.

The actuating device 57 connected to the clutch mechanism 58 is a solenoid operated device which is biased to a position permitting the clutch to act normally while solenoid actuation will lock the clutch in a position which will prevent a drive between sleeve 48 and sleeve 54. Planetary gear unit can be of any known arrangement providing proper ratio of shaft speeds.

The transition lever 200, referred to above, when in position 1 has switched off all power from a source of power to the output terminals T1, T2, and T3 of the transition control device 201. When the transition lever 200 is in position 2, it connects a source of power to the output terminals T1 and T2 of the transition control device 201. The signal passing from terminal T1 actuates the solenoid of the switching device 220 and the solenoid of the actuating device 57. The signal passing from terminal T2 is sent to the control device 300 for a purpose to be hereinafter described. When the transition lever is in position 3 it connects a source of power to output terminals T1 and T3. The signal passing from terminal T3 is sent to the control device 300 for a purpose to be hereinafter described.

The control device 300 provides the automatic control for the electric actuator 112 which actuates the longitudinal cyclic pitch control. The control device includes an electric r.p.m. indicator 302 which puts out a signal which indicates the r.p.m. of the driving shaft 40. The indicator 302 senses the r.p.m. of the driving shaft 40 by a shaft 304 which is drivingly connected to the shaft 40 by a pair of bevel gears 306 and 308. The signal put out by the electric r.p.m. indicator is directly proportional to the r.p.m. of the shaft 40. Also included in the control device 300 is a switching device 310. This switching device has two reference signals directed thereto. One reference signal is directed to an input A by a signal device 312. This device 312 provides a signal which is set to equal a value corresponding to the desired r.p.m. of the rotor shaft 40 during the helicopter mode of operation. A second reference signal is directed to an input B by a signal device 314. This device 314 provides a signal which is set to equal a value corresponding to the desired r.p.m. of the rotor shaft 40 during the airplane mode of operation. The signal devices 312 and 314 are constructed so that the signal output can be changed to different values. Each device has an external adjusting knob.

The output terminal T2 of the transition control device 201 is connected to terminal 2 of the switching device 310 and the output terminal T3 is connected to the terminal 3. A rate controlled motor 316 is connected to terminal 4 of the switching device 310. This motor controls the rate of change of rotor speed so that the rotor is under precise control of the automatic control 300 during transitions. This rate is maintained to keep the proper relationship between the available accelerating or decelerating torque and the moment of inertia of the rotor. This provides that a cyclic pitch is not commanded which would produce a decelerating torque when an accelerating torque is necessary and conversely. In other words, the command rate of speed is predetermined so that the torque required does not exceed the torque available. The motor 316 has an output shaft which is connected to a servo potentiometer 318 to control its output. A source of power 320 is connected to the potentiometer 318 from which its output is taken. The output of this potentiometer 318 is directed to a summer 322 and to terminal 1 of the switching device 310. The signal output of the r.p.m. indicator 302 is also directed to the summer 322.

The switching device 310 is constructed so that when a signal passes from the transition control device 201 to the terminal 2 of the switching device, it connects the signal at input A to the signal at terminal 1 so that they can be compared. If the signal at terminal 1 is greater than the signal at input A, a switch is actuated to operate motor 316 in a direction so that the potentiometer 318 is moved to reduce its output to a value equal to that at A. If the signal at terminal 1 is less than the signal at input A, a switch is actuated to operate motor 316 in an opposite direction so that the potentiometer is moved to increase its output to a value equal to that at A. If the signals at terminal 1 and input A are equal, then neither switch is actuated and the control remains as it is.

When a signal passes from the transition control device 201 to terminal 3 of the switching device, it connects the signal at input B to the signal at terminal 1 so that they can be compared. Here the operation is the same as above. If the signal at terminal 1 is greater than the signal at input B, a switch is actuated to operate motor 316 in a direction so that the potentiometer 318 is moved to reduce its output to a value equal to that at B. If the signal at terminal 1 is less than the signal at input B, a switch is actuated to operate motor 316 in a direction so that the potentiometer 318 is moved to increase its output to a value equal to that at B.

The summer 322 makes a summation of the two signals directed thereto, that is, the signal from the electric r.p.m. indicator 302 and the potentiometer 318. The signals from the r.p.m. indicator and the potentiometer must be of opposite sign or polarity. If the value of the signal from the indicator 302 is less than the value of the signal from the potentiometer 318, then the electric actuator 112 is actuated in a manner to position the rotor blades to permit the r.p.m. of the rotor shaft to increase. If the value of the signal from the indicator 302 is greater than the value of the signal from the potentiometer 318, then the actuator 112 is actuated in a manner to position the rotor blades to permit the r.p.m. of the rotor shaft to decrease.

The operational cycle of the compound helicopter is divided into three modes,
 (1) The powered rotor or helicopter mode,
 (2) The transition mode,
 (3) The deactivated rotor or airplane mode.

The transition is performed at the lower limit of the airplane mode. In the first part of the transition, the collective pitch of the rotor is reduced to a low predetermined value, between 0° and −5°, while the rotor speed is maintained at the predetermined value required for helicopter operation by the engine governor. During rotor speed transition, the rotor is decelerated from the powered helicopter predetermined r.p.m. to a second predetermined r.p.m. required for its autorotation during the airplane mode. These steps are reversed for transition from airplane mode to helicopter mode. The relationship between the powered helicopter r.p.m. and the lower r.p.m. for autorotative airplane flight is approximately 2 to 1.

In converting from airplane to helicopter flight, the transition lever 200 cannot be moved directly from position 3 to position 1 because of the incompatibility of engine and rotor speeds. The change of the transition lever from position 3 to position 2 causes the acceleration of the autorotating rotor from the predetermined r.p.m. desired for airplane operation to the predetermined r.p.m. desired for powered helicopter operation. After the rotor has reached the predetermined r.p.m. for helicopter operation, the transition lever is moved to position 1. As stated here and before this action connects terminal $S_1$ to terminal $S_3$ so that the azimuth lever 202 controls the longitudinal cyclic pitch. This action also deactuates the device 57 so that the clutch mechanism 58 will operate normally which will permit lower sleeve 48 to drive sleeve 54. In going from position 2 to position 1, the longitudinal cyclic pitch is gradually phased in with the azimuth lever to avoid any abrupt maneuvers which would follow a sudden change in rotor angle of attack.

Figure 6:
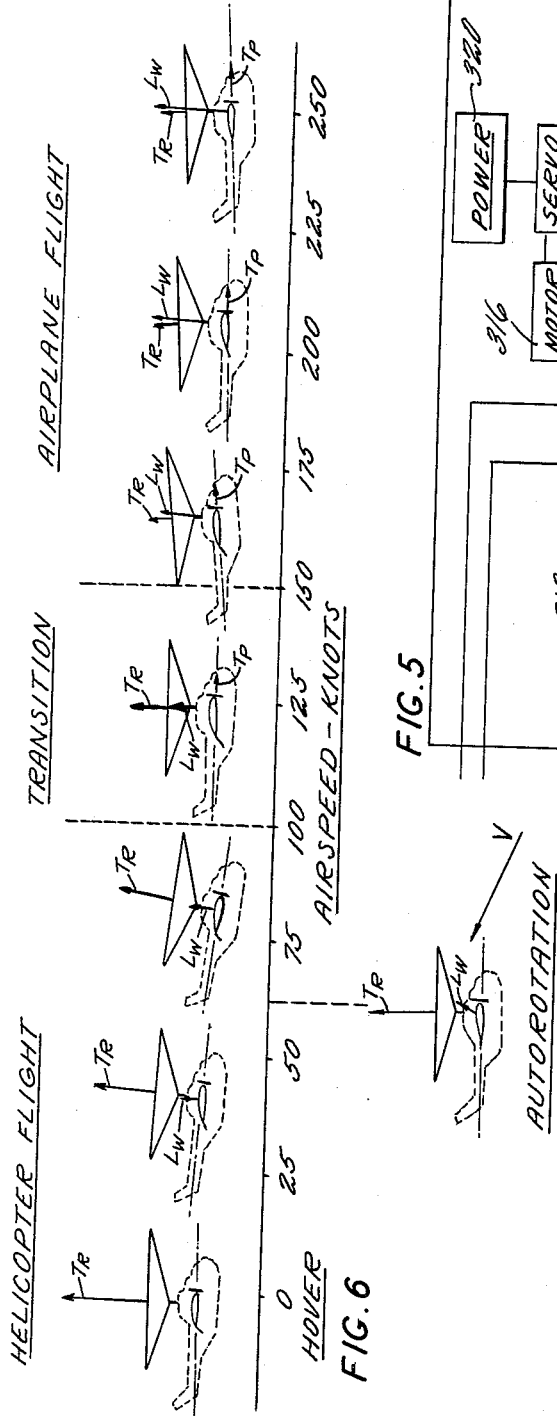
FIG. 6 is a diagram of the compound helicopter flight cycle.

Normal helicopter procedures are followed by the compound helicopter pilot in hover and in low speed flight up to transition. (See FIG. 6.) The flaps are kept extended throughout the helicopter mode, except for autorotation descent, in which the flaps are retracted to reduce the effective wing incidence. In FIG. 6 $T_r$ is the thrust of the rotor, $L_w$ is the wing lift, $T_p$ is the thrust of the propellers, and V is the relative wind velocity.

For a constant speed transition, at the transition speed the collective pitch lever 204 is moved to the position indicated by holding means 205, thus setting the collective pitch to the value required for autorotation in the airplane mode of operation. Simultaneously, the aircraft angle of attack and propeller thrust are increased to compensate for the decrease in rotor lift force caused by the reduction in collective pitch setting. The collective pitch lever is not moved again during the transition mode of operation or the airplane mode of operation. The rotor speed transition is initiated by moving the transition lever from position 1 to position 3. As the rotor is decelerated by the control device 300 the resultant rotor force changes are compensated for by corrective control application with the azimuth lever. When the preselected rotor r.p.m. desired for the airplane mode of operation is attained, standard fixed wing aircraft procedures are followed in operating the compound helicopter as an airplane from transition to top speed. The flaps are retracted with increasing speed.

The return from the airplane mode of operation to the helicopter mode of operation with a constant speed transition is accomplished by reversing the procedure just set forth. Propeller thrust is reduced and the aircraft is decelerated to transition speed. The flaps are extended with decreasing air speed. At transition speed the transition lever 200 is moved from position 3 to position 2. This initiates the acceleration of the rotor from the predetermined rotor speed during airplane mode of operation to the predetermined rotor speed of helicopter mode of operation in an unpowered state. When the rotor has reached the predetermined r.p.m. desired for the helicopter mode of operation, the transition lever is moved from position 2 to position 1, thereby re-engaging the engine to the rotor through the clutch mechanism 58 and placing the longitudinal cycle pitch control under command of the azimuth stick. Finally, the collective pitch is raised while propeller thrust is reduced to zero.

While transition at a constant speed has been discussed, this is not the only means by which transition can be accomplished.

It is to be understood that the invention is not limited to the specific embodiment herein illustrated and described, but may be used in other ways without departure from its spirit as defined in the following claims.

I claim:
1. In a compound aircraft having a helicopter mode of operation and an airplane mode of operation,
 (a) a fuselage,
 (b) a rotor mounted thereon,
 (c) said rotor having blades,
 (d) means for changing the pitch of said blades cyclically,
 (e) said fuselage having a wing and an empennage,
 (f) an engine mounted on each side of said fuselage,
 (g) each engine having a propeller,
 (h) pilot operated means for changing the pitch of said propellers,
 (i) means drivingly connecting both engines to said rotor,
 (j) means for disconnecting said last named means,
 (k) pilot operated means for operating said means for changing the pitch of said blades cyclically during helicopter mode of operation,
 (l) and automatic means for operating said means for changing the pitch of said blades cyclically during airplane mode of operation when said means driving- ly connecting both engines to said rotor has been disconnected.

2. In a compound aircraft having a helicopter mode of operation and an airplane mode of operation,
   (a) a fuselage,
   (b) a rotor mounted thereon,
   (c) said rotor having blades,
   (d) means for changing the pitch of said blades cyclically,
   (e) said fuselage having a wing and an empennage,
   (f) said wing having flaps which reduce the area of the wing on which the downwash can act,
   (g) means for placing said flaps in an extended position during helicopter mode of operation,
   (h) pilot operated means for operating said means for changing the pitch of said blades cyclically during helicopter mode of operation,
   (i) and automatic means for operating said means for changing the pitch of said blades cyclically during airplane mode of operation.

3. In a compound aircraft having a helicopter mode of operation and an airplane mode of operation,
   (a) a fuselage,
   (b) a rotor mounted thereon,
   (c) said rotor having blades,
   (d) means for changing the pitch of said blades cyclically,
   (e) said fuselage having a wing and an empennage,
   (f) said empennage having a tail rotor and a rudder,
   (g) means for operating said tail rotor and rudder together during helicopter mode of operation and airplane mode of operation,
   (h) pilot operated means for operating said means for changing the pitch of said blades cyclically during helicopter mode of operation,
   (i) and automatic means for operating said means for changing the pitch of said blades cyclically during airplane mode of operation.

4. In a compound aircraft having a helicopter mode of operation and an airplane mode of operation,
   (a) a fuselage,
   (b) a rotor shaft mounted on said fuselage having a shaft tilt angle of zero,
   (c) a rotor mounted on said shaft,
   (d) said rotor having blades,
   (e) means for changing the pitch of said blades cyclically,
   (f) said fuselage having a wing and an empennage,
   (g) said wing having a symmetrical airfoil section,
   (h) said wing having an angle of incidence of approximately zero degrees,
   (i) pilot operated means for operating said means for changing the pitch of said blades cyclically during helicopter mode of operation,
   (j) and automatic means for operating said means for changing the pitch of said blades cyclically during airplane mode of operation.

5. In a compound aircraft having a helicopter mode of operation and an airplane mode of operation,
   (a) a fuselage,
   (b) a rotor mounted thereon,
   (c) said rotor having blades,
   (d) means for changing the pitch of said blades collectively,
   (e) means for changing the pitch of said blades cyclically,
   (f) said fuselage having a wing and an empennage,
   (g) pilot operated means for operating said means for changing the pitch of said blades cyclically during helicopter mode of operation,
   (h) automatic means for operating said means for changing the pitch of said blades cyclically during airplane mode of operation to maintain a preselected r.p.m.,
   (i) and means for placing said blades at a predetermined low collective pitch setting during airplane mode of operation.

6. In a compound aircraft having a helicopter mode of operation and an airplane mode of operation,
   (a) a fuselage,
   (b) a rotor mounted thereon,
   (c) said rotor having blades,
   (d) means for changing the pitch of said blades collectively,
   (e) means for changing the pitch of said blades cyclically,
   (f) said fuselage having a wing and an empennage,
   (g) pilot operated means for operating said means for changing the pitch of said blades cyclically during helicopter mode of operation,
   (h) automatic means for operating said means for changing the pitch of said blades cyclically during airplane mode of operation to maintain a preselected r.p.m.,
   (i) and means for placing said blades at a predetermined low collective pitch setting during airplane mode of operation,
   (j) said low collective pitch setting being in a range of from 0° to −5°.

7. In a compound aircraft having a helicopter mode of operation and an airplane mode of operation,
   (a) a fuselage,
   (b) a rotor mounted thereon,
   (c) said rotor having blades,
   (d) means for rotating said rotor at a first predetermined r.p.m. during helicopter mode of operation,
   (e) and automatic means for maintaining said rotor at a second predetermined r.p.m. during airplane mode of operation,
   (f) said automatic means including means for changing the pitch of said blades cyclically.

8. Method of operating a convertiplane having a rotor including blades which comprises,
   (a) maintaining a first predetermined rotor r.p.m. while powered during helicopter mode of operation,
   (b) maintaining a second predetermined rotor r.p.m. while autorotating during airplane mode of operation,
   (c) and placing said blades at a predetermined low collective pitch setting for airplane mode of operation.

9. Method of operating a convertiplane having a rotor including blades which comprises,
   (a) maintaining a first predetermined rotor r.p.m. while powered during helicopter mode of operation,
   (b) maintaining a second predetermined rotor r.p.m. while autorotating during airplane mode of operation by changing the cyclic pitch of said blades,
   (c) and placing said blades at a predetermined low collective pitch setting in a range of from 0° to −5° for airplane mode of operation.

10. In a compound aircraft having a helicopter mode of operation and an airplane mode of operation,
    (a) a fuselage,
    (b) a rotor mounted thereon,
    (c) said rotor having blades,
    (d) means for changing the pitch of said blades cyclically,
    (e) said fuselage having a wing and an empennage,
    (f) an engine mounted on each side of said fuselage,
    (g) each engine having a propeller,
    (h) pilot operated means for changing the pitch of said propellers,
    (i) means drivingly connecting both engines to said rotor,
    (j) means for disconnecting said last-named means,
    (k) pilot operated means for operating said means for changing the pitch of said blades cyclically during helicopter mode of operation, (*l*) and automatic means for operating said means for changing the pitch of said blades cyclically during airplane mode of operation to maintain a preselected r.p.m. while said means drivingly connecting both engines to said rotor is disconnected.

11. In a compound aircraft having a helicopter mode of operation, a transition mode of operation and an airplane mode of operation,
 (*a*) a fuselage,
 (*b*) a rotor mounted thereon,
 (*c*) said rotor having blades,
 (*d*) powerplant means for driving said rotor at a first predetermined r.p.m. during helicopter mode of operation,
 (*e*) means disconnecting said powerplant means from driving said rotor during transition mode of operation and airplane mode of operation,
 (*f*) means for changing the pitch of said blades cyclically,
 (*g*) said fuselage having a wing and an empennage,
 (*h*) pilot operated means for operating said means for changing the pitch of said blades cyclically during helicopter mode of operation,
 (*i*) and automatic means for operating said means for changing the pitch of said blades cyclically during airplane mode of operation to maintain said rotor at a second predetermined r.p.m.,
 (*j*) said automatic means providing during transition mode of operation from airplane mode of operation that the speed of said rotor is brought to a value equal to said first predetermined r.p.m.

12. In a compound aircraft having a helicopter mode of operation and an airplane mode of operation,
 (*a*) a fuselage,
 (*b*) a rotor mounted thereon,
 (*c*) said rotor having blades,
 (*d*) means for changing the pitch of said blades cyclically,
 (*e*) said fuselage having a wing and an empennage,
 (*f*) pilot operated means for operating said means for changing the pitch of said blades cyclically during helicopter mode of operation,
 (*g*) and automatic means for operating said means for changing the pitch of said blades cyclically during airplane mode of operation,
 (*h*) said automatic means having a first device sensing rotor r.p.m.
 (*i*) said automatic means having a reference device indicating a predetermined r.p.m.,
 (*j*) said automatic means having a second device for comparing said sensed r.p.m. with said referenced r.p.m. and putting out a signal if they are not the same,
 (*k*) said signal being connected to said means for changing the pitch of said blades cyclically during airplane mode of operation to change the pitch of said blades cyclically until the second device ceases to put out a signal.

13. In a compound aircraft having a helicopter mode of operation, a transition mode of operation and an airplane mode of operation,
 (*a*) a fuselage,
 (*b*) a rotor mounted thereon,
 (*c*) said rotor having blades,
 (*d*) means driving said rotor at a first predetermined r.p.m. during helicopter mode of operation,
 (*e*) means for changing the pitch of said blades cyclically,
 (*f*) said fuselage having a wing and an empennage,
 (*g*) pilot operated means for operating said means for changing the pitch of said blades cyclically during helicopter mode of operation,
 (*h*) and automatic means for operating said means for changing the pitch of said blades cyclically during airplane mode of operation to maintain a second predetermined r.p.m.,
 (*i*) said automatic means having a first device sensing rotor r.p.m.,
 (*j*) said automatic means having a reference device indicating a predetermined r.p.m.,
 (*k*) said reference device having means for varying the indicated predetermined r.p.m. between said two predetermined values,
 (*l*) said automatic means having a second device for comparing said sensed r.p.m. with said referenced r.p.m. and putting out a signal if they are not the same,
 (*m*) said signal being connected to said means for changing the pitch of said blades cyclically during airplane mode of operation to change the pitch of said blades cyclically until the second device ceases to put out a signal.

14. In a compound aircraft having a helicopter mode of operation and an airplane mode of operation,
 (*a*) a fuselage,
 (*b*) a rotor mounted thereon,
 (*c*) said rotor having blades,
 (*d*) means for changing the pitch of said blades cyclically,
 (*e*) said fsuelage having a wing and an empennage,
 (*f*) pilot operated means for operating said means for changing the pitch of said blades cyclically during helicopter mode of operation,
 (*g*) and automatic means for operating said means for changing the pitch of said blades cyclically during airplane mode of operation,
 (*h*) said automatic means having a first device sensing rotor r.p.m.,
 (*i*) said automatic means having a reference device indicating two predetermined r.p.m.'s,
 (*j*) said reference device having means for varying the indicated predetermined r.p.m. between said two predetermined values at a predetermined rate,
 (*k*) said automatic means having a second device for comparing said sensed r.p.m. with said referenced r.p.m. and putting out a signal if they are not the same,
 (*l*) said signal being connected to said means for changing the pitch of said blades cyclically during airplane mode of operation to change the pitch of said blades cyclically until the second device ceases to put out a signal.

15. In a compound aircraft having a helicopter mode of operation, a transition mode of operation and an airplane mode of operation,
 (*a*) a fuselage,
 (*b*) a rotor mounted thereon,
 (*c*) said rotor having blades,
 (*d*) means for rotating said rotor at a first predetermined r.p.m., during helicopter mode of operation,
 (*e*) and automatic means for maintaining said rotor at a second predetermined r.p.m. during airplane mode of operation,
 (*f*) said automatic means including means for changing the pitch of said blades cyclically,
 (*g*) said automatic means varying rotor r.p.m. between said first predetermined value and said second predetermined value during transition mode of operation.

16. In a compound aircraft having a helicopter mode of operation, a transition mode of operation and an airplane mode of operation,
 (*a*) a fuselage,
 (*b*) a rotor mounted thereon,
 (*c*) said rotor having blades,
 (*d*) means for rotating said rotor at a first predetermined r.p.m. during helicopter mode of operation,
 (*e*) and automatic means for maintaining said rotor at a second predetermined r.p.m. during airplane mode of operation, (f) said automatic means including means for changing the pitch of said blades cyclically,
(g) said automatic means varying rotor r.p.m. between said first predetermined value and said second predetermined value during transition mode of operation,
(h) said automatic means having a device for controlling the rate of change between the two values of r.p.m.

17. In a compound aircraft having a helicopter mode of operation and an airplane mode of operation,
(a) a fuselage,
(b) a rotor mounted thereon,
(c) said rotor having blades,
(d) means for rotating said rotor at a first predetermined r.p.m. during helicopter mode of operation,
(e) and automatic means for maintaining said rotor at a second predetermined r.p.m. during airplane mode of operation,
(f) said automatic means including means for changing the pitch of said blades cyclically,
(g) the ratio of said first predetermined r.p.m. to said second predetermined r.p.m. being approximately 2 to 1.

18. In a compound aircraft having a helicopter mode of operation, a transition mode of operation and an airplane mode of operation,
(a) a fuselage,
(b) a rotor mounted thereon,
(c) said rotor having blades,
(d) powerplant means for driving said rotor at a first predetermined r.p.m. during helicopter mode of operation,
(e) means disconnecting said powerplant means from driving said rotor during transition mode of operation and airplane mode of operation,
(f) means for changing the pitch of said blades cyclically,
(g) said fuselage having a wing and an empennage,
(h) pilot operated means for operating said means for changing the pitch of said blades cyclically during helicopter mode of operation,
(i) and automatic means for operating said means for changing the pitch of said blades cyclically during airplane mode of operation to maintain said rotor at a second predetermined r.p.m.,
(j) said automatic means providing during transition mode of operation from helicopter mode of operation that the speed of said rotor is brought to a value equal to said second predetermined r.p.m.

References Cited in the file of this patent
UNITED STATES PATENTS

| | | |
|---|---|---|
| 2,496,385 | Drapier | Feb. 7, 1950 |
| 2,665,859 | Papadakos | Jan. 12, 1954 |
| 2,680,579 | Hohenemser | June 8, 1954 |